United States Patent
Snook

(10) Patent No.: US 6,725,979 B1
(45) Date of Patent: Apr. 27, 2004

(54) TIRE STOP LOCK

(76) Inventor: Kenneth G. Snook, 89 S. Taylor St., Nampa, ID (US) 83687

( * ) Notice: Subject to any disclaimer, the term of this patent is extended or adjusted under 35 U.S.C. 154(b) by 0 days.

(21) Appl. No.: 10/188,825

(22) Filed: Jul. 5, 2002

(51) Int. Cl.[7] .................................................. B60T 3/00
(52) U.S. Cl. ........................................ 188/32; 188/4 R
(58) Field of Search ............................. 188/32, 4 R, 5, 188/36, 37; D12/217; D8/330; 410/30, 42, 49

(56) References Cited

U.S. PATENT DOCUMENTS

| | | | |
|---|---|---|---|
| 2,475,111 A | * 7/1949 | Ridland | 188/32 |
| 2,773,564 A | * 12/1956 | Gerard, Sr. | 188/32 |
| 2,822,063 A | * 2/1958 | Hampton | 188/32 |
| 3,734,241 A | * 5/1973 | Hale | 188/32 |
| 4,031,983 A | 6/1977 | Lentini | |
| 4,399,893 A | 8/1983 | Switzer | |
| 4,649,724 A | 3/1987 | Raine | |
| 4,804,070 A | * 2/1989 | Bohler | 188/32 |
| 5,388,937 A | * 2/1995 | Farsai | 188/32 |
| 5,628,212 A | 5/1997 | Fritzler | |
| D385,526 S | * 10/1997 | Hinkle | D12/217 |
| D418,391 S | 1/2000 | Tsai | |
| D419,424 S | * 1/2000 | Holden | D8/341 |

* cited by examiner

Primary Examiner—Jack Lavinder
Assistant Examiner—Melanie Torres
(74) Attorney, Agent, or Firm—Randal D. Homburg

(57) ABSTRACT

The invention is a safety lock applied to a vehicle wheel during a road stop to prevent the vehicle from moving or being driven away during the stop. This safety lock would be applied to any tire on the vehicle by law enforcement or safety inspectors during the stop, the safety lock slid onto the tire from the outside of the tire, with friction enhanced chocks in front and in back of the tire, locking onto the tire to prevent the rotation of the tire, reducing the risk of injury or escape in the event an attempt is made to drive away during the road stop. It may also be used to secure a tire or wheel during maintenance or during an emergency roadside repair, the device compact enough to fit in the trunk of a car and light enough in weight to be carried by an average individual.

4 Claims, 2 Drawing Sheets

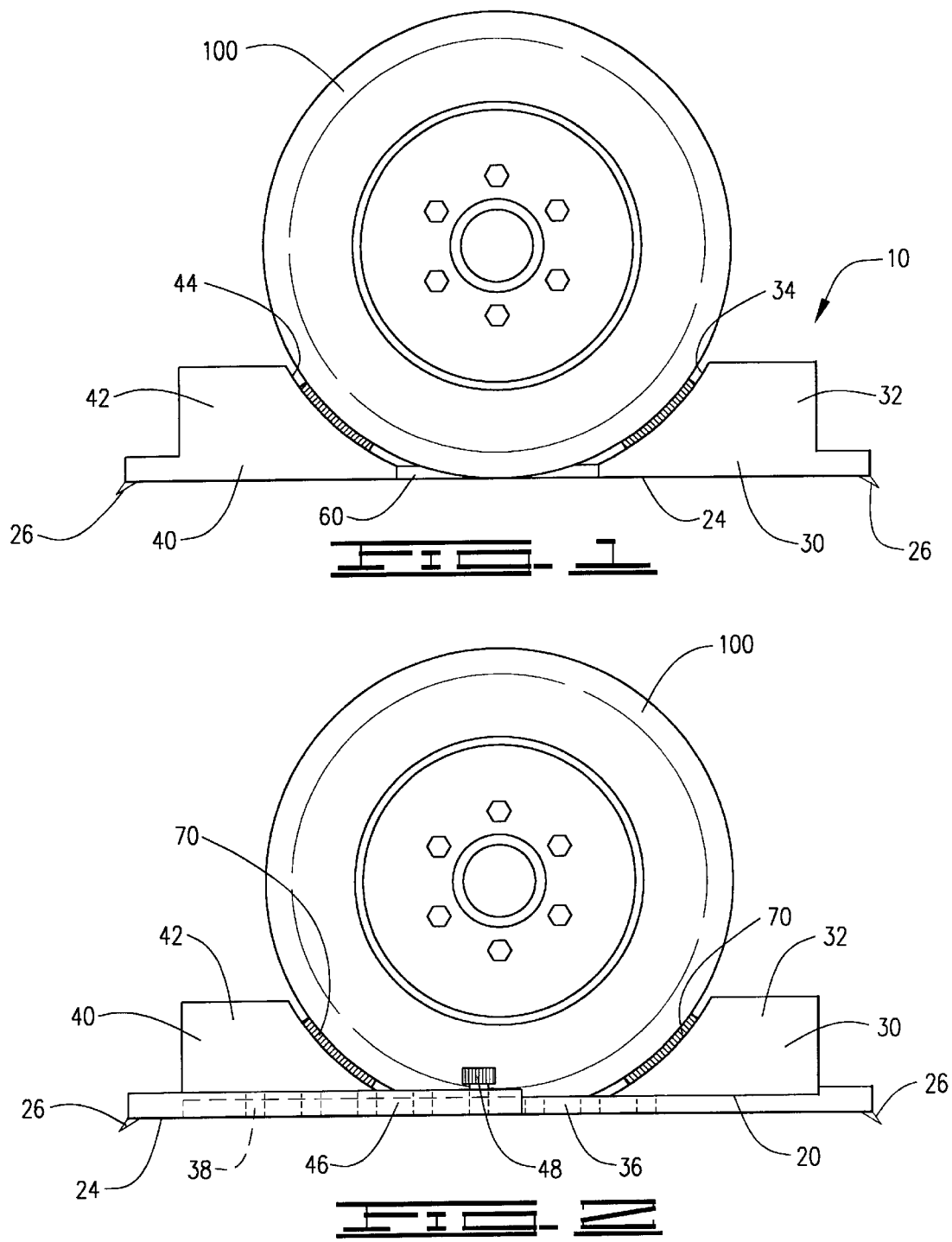

TIRE STOP LOCK

CROSS REFERENCE TO RELATED APPLICATIONS

None

I. BACKGROUND OF THE INVENTION

1. Field of Invention

The invention is a safety lock applied to a vehicle wheel during a road stop to prevent the vehicle from moving or being driven away during the stop. This safety lock would be applied to any tire on the vehicle by law enforcement or safety inspectors during the stop, the safety lock slid onto the tire from the outside of the tire, with friction enhanced chocks in front and in back of the tire, locking onto the tire to prevent the rotation of the tire, reducing the risk of injury or escape in the event an attempt is made to drive away during the road stop. It may also be used to secure a tire or wheel during maintenance or during an emergency roadside repair, the device compact enough to fit in the trunk of a car and light enough in weight to be carried by an average individual.

2. Description of Prior Art

The following United States patents were discovered and are disclosed within this application for utility patent. All relate to tire or wheel immobilizers.

In U.S. Pat. No. 4,031,983 to Lentini, a tire chock is disclosed having a base member which clamps onto a circumferential periphery of a wheel over a tire on either a front side or a back side, but not both sides. This device is engaged by screwing two gripping arms together with a concave surfaced solid block of rigid material attached between the gripping arms in contact with the tire surface. This device does not engage the front and rear surface of a tire at the same time, and it requires a screw to be turned to engage the device.

Another anti-theft device is shown in U.S. Pat. No. 5,628,212 to Fritzler, wherein another single contact surface device is disclosed having engaging means with the circumferential periphery of a wheel having an adjustable screw clamp in which a bar is rotated clamping two surfaces around the tire and wheel, after which the screw clamp is locked with a padlock. In the patent, use of two devices, one in front of the tire and another in back of the tire, form two "chocks" on the tire, but two devices are required to form this two surface contact, two padlocks are required, and two installations are needed to perform this function, which the current invention accomplishes in a single embodiment. It also requires one to screw the device onto the wheel.

A wheel lock for a dual wheeled device is disclosed in U.S. Pat. No. 4,399,893 to Switzer which is not adapted to engage a single tire and wheel, relying on the locking cross brace to engage the inner rims of a dual wheel mounting system, locking the two chocks, applied to either the front or rear of the dual tires, to the tire surfaces. A Y-shaped tire lock, apparently surrounding a tire at three contact points, is disclosed in U.S. Design Pat. No. D 418,391 to Tsai, appearing to engage a tire on a front, rear and top, or at least three points in a Y pattern on the tire, with what appears to be a slide locking bar, one of the three arms comprising the lock slidable engaged with the other two with a key lock system.

A dual chock system, placing one chock in front of the tire and another at the rear of the tire, is disclosed in U.S. Pat. No. 4,649,724 to Raine. This vehicle immobilization device includes a pair of chocks and a top hook which is hooked over the wheel at a point above the central ground contact point, chock arms adjustably connecting the two chocks with an adjustable stem correcting the top hook to the chock arms. The adjustable stem and the chock arms are locked together, the lock having opposing corrugate strips which, when compressed by the foot channel, lock the two facing channels of the chock arms together preventing separation of the two chock arms holding the two chocks firmly against the front and rear surfaces of the tire. This patent is distinguishable by requiring two distinct locking means in perpendicular directions to engage the three locking components, comprised of the two chocks and the top hook, has no friction enhancing means of the tire contact surfaces of the chocks, and also does not have ground contact cleats on the bottom of the chocks to prevent lateral movement of the chocks.

II. SUMMARY OF THE INVENTION

Every year, during traffic or safety inspection stops, law enforcement and inspectors are injured when motor vehicles are moved during the course of a stop, either on purpose or due to criminal attempt at escape. Law enforcement officers have generally only had their presence to thwart such escape or movement, leaving them at risk of severe or fatal injury. A device to prevent such movement, light enough to carry and simple enough to install in a matter of seconds without a great deal of attention to the application of the device, is sought to reduce the possibility of vehicle movement during the stop. The current device, unlike the other patents disclosed, accomplishes the following objectives.

The primary objective of the invention provide a quickly installed tire safety lock to prevent the movement of a vehicle during a safety or traffic stop, applied to a vehicle wheel by sliding the tire safety lock from the outside of the tire, placing a front chock and rear chock in front and behind a tire, capturing the tire within the chock until after the tire safety lock is removed.

A second objective allows the device to literally be installed by placing the device on the ground and sliding it onto the tire using the feet without requiring the person installing the device to bend over during installation.

Yet another objective is accomplished in the device, employing friction enhanced contact surfaces on the chocks and cleats on the bottom of the base members, firmly engages the device to the surface of the captured tire and the ground, using gravity and friction to hold the tire within the safety stop lock of the current invention.

III. DESCRIPTION OF THE DRAWINGS

The following drawings are submitted with this utility patent application.

FIG. 1 is a side view of the safety stop lock.

FIG. 2 is an opposing side view of the safety stop lock.

IV. DESCRIPTION OF THE PREFERRED EMBODIMENT

Figure 3:
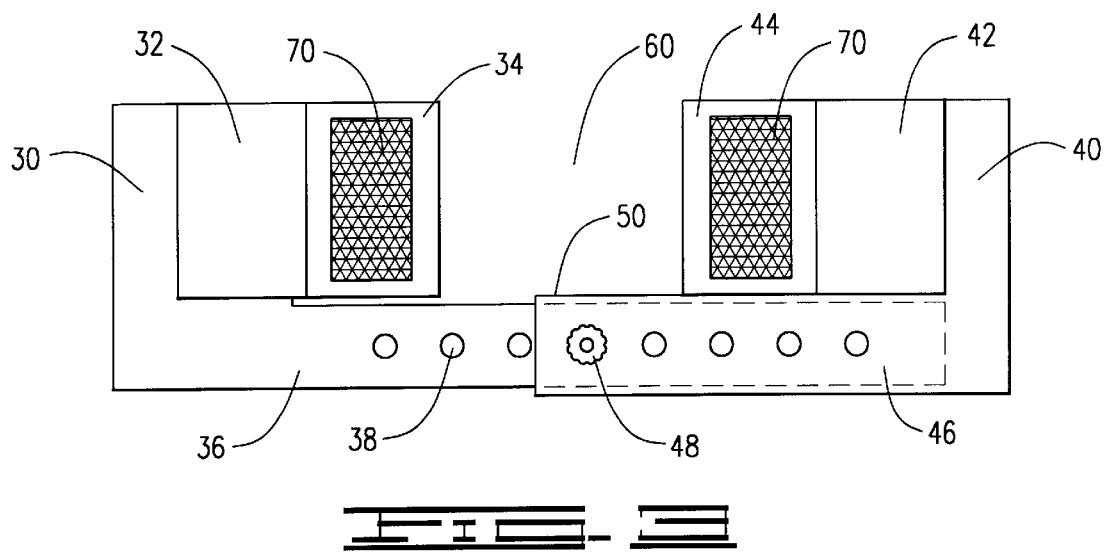
FIG. 3 is a top view of the safety stop lock.

The invention disclosed herein is a safety stop lock 10, shown in FIGS. 1–4 of the drawings, used for temporarily securing a tire 100 of a vehicle during a traffic stop, either by law enforcement or during an emergency repair, the safety stop lock 10 comprising essentially a flat base member 20 having a stationary section 30 and a sliding engagement section 40 forming a tire slot 60, the flat base member 20 having a plurality of descending ground engaging cleats 26 to prevent movement of the flat base member 20 once the safety stop lock 10 is secured to the tire 100, the sliding engagement section 40 slidably engaging the stationary section 30 with a locking means 50 to secure the sliding engagement section 40 at a selected location on the stationary section 30, a front chock 32 rising from the stationary section 30 and a rear chock 42 arising from the sliding engagement section 40, each front chock 32 and rear chock 42 having concave inner surfaces 34, 44 to which an abrasive friction-enhancing coating 70 is applied, wherein the safety stop lock 10 is slid onto the tire 100, with the tire 100 captured within the tire slot 60 from the outside of the tire, after which the sliding engagement section 40 and stationary section 30 are slid together placing the friction-enhancing coating 70 on the respective concave inner surfaces 34, 44 of the front chock 32 and rear chock 42 against the tire 100, shown in FIGS. 1 and 2, preventing movement of the tire 100 while the tire is secured by the safety stop lock 10.

Figure 4:
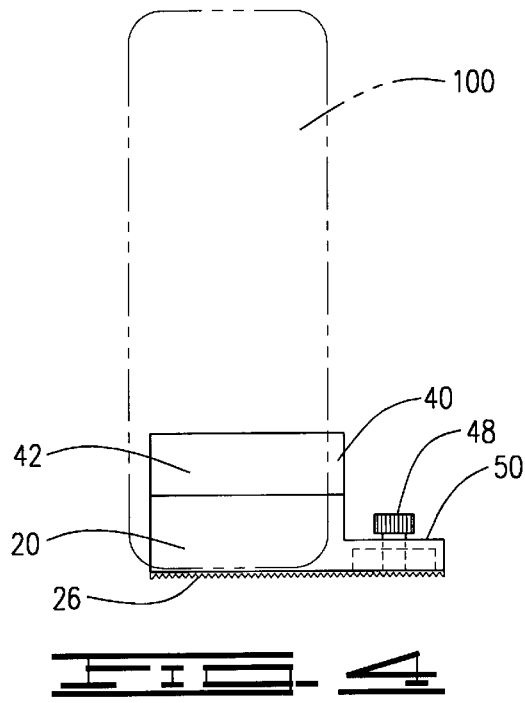
FIG. 4 is an end view of the safety stop lock.

The locking means 50 of the safety stop lock 10, shown in FIGS. 3 and 4 of the drawings, further includes an arm portion 36 on the stationary section 30 of the flat base member 20 having a plurality of spaced engagement holes 38 and the sliding engagement section 40 having a sleeve 46 receiving the arm portion 36 of the stationary section 30, the sleeve 46 including an attached spring loaded pin 48, the spring loaded pin 48 engaging any of the spaced engagement holes 38, allowing the stationary section 30 and sliding engagement section 40 to provide for multiple widths of the tire slot 60, accepting multiple sizes of tires to which the safety stop lock 10 may be applied. It is preferred that the spring loaded pin 48 allow for the reduction of width of the tire slot 60 without restriction, but that expansion of the width of the tire slot 60 requires intentional action to remove the spring loaded pin 48 from the engagement hole 38 within which is locked, thus avoiding the unintentional release of the tire 100 from the safety stop lock 10.

The ground engaging cleats 26, shown in FIGS. 1, 2 and 4, positioned on the flat base member 20 are most preferably pointed metal spikes which protrude from a lower surface 24 of the flat base member 20 at somewhat of an angle to urge the cleats 26 into the road surface when attempt is made to move the vehicle forward or backward when the safety stop lock 10 is engaged to the tire 100.

The abrasive friction-enhancing coating 70 may be presented as a very coarse, high friction material adhered to the concave inner surfaces 34, 44 of the front chock 32 and rear chock 42 or it may be comprised of a series of erect stiff sharp wires forming a bristled surface which slightly penetrate the tread surface of the tire, but not so far as to cause a penetration of the tire or tire deflation.

It is preferred that the overall size of the safety stop lock 10 be small enough to fit in the trunk of a car and light enough to be carried by an average law enforcement officer with one hand. It is most preferred that the locking means 50 is capable of being engaged and disengaged with the foot of the person applying the safety stop lock 10. In furtherance of this preference, the spring loaded pin 48 may include an oversized head which may be lifted by the tip of a shoe of the user.

While the invention has been particularly shown and described with reference to a preferred embodiment thereof, it will be understood by those skilled in the art that changes in form and detail may be made therein without departing from the spirit and scope of the invention.

What is claimed is:

1. A safety stop lock, used for temporarily securing a tire of a vehicle during a traffic stop, either by law enforcement or during an emergency repair, the safety stop lock comprising:

a flat base member having a stationary section and a sliding engagement section forming a tire slot, the flat base member having a plurality of ground engaging cleats to prevent movement of the flat base member once the safety stop lock is secured to the tire, the sliding engagement section slidably engaging the stationary section with a locking means to secure the sliding engagement section at a selected location on the stationary section; and a front chock rising from the stationary section and a rear chock arising from the sliding engagement section, the front chock and rear chock having a concave inner surface to which an abrasive friction-enhancing coating is applied, wherein the safety stop lock is slid onto the vehicle tire, with the tire located in the tire slot from the outside of the tire, after which the sliding engagement section and stationary section are slid together placing the friction-enhancing coating on the respective concave inner surfaces of the front chock and rear chock against a tread surface of the tire, preventing movement of the tire while the tire is secure by the safety stop lock.

2. The safety stop lock as disclosed in claim 1, the locking means of the safety stop lock further comprising:

an arm portion on the stationary section of the flat base member having a plurality of spaced engagement holes;

the sliding engagement section having a sleeve receiving the arm portion of the stationary member, a spring loaded pin attached to the sleeve of the sliding engagement section, the spring loaded pin engaging any of the spaced engagement holes, allowing the stationary section and sliding engagement section to provide for multiple widths of the tire slot, accepting multiple sizes of tires to which the safety stop lock may be applied.

3. The locking means, as disclosed in claim 1, wherein such locking means allows reduction of the tirer slot without restriction during engagement of the safety stop lock with the tire, while expansion of the tire slot requires intentional action to disengage the safety stop lock from the tire, thus avoiding the unintentional release of the tire from the safety stop lock.

4. The ground engaging cleats of claim 1, wherein such ground engaging cleats are positioned on the flat base member protruding from a lower surface of the flat base member at somewhat of an angle urging the cleats in a downward angled manner to penetrate into the road surface when attempt is made to move the vehicle forward or backward when the safety stop lock is engaged to the tire.

* * * * *